United States Patent [19]
Davis

[11] Patent Number: 5,302,064
[45] Date of Patent: Apr. 12, 1994

[54] CARGO TIEDOWN

[76] Inventor: Jim B. Davis, 10350 56th St., Mira Loma, Calif. 91752

[21] Appl. No.: 76,760

[22] Filed: Jun. 15, 1993

[51] Int. Cl.⁵ .............................................. B60P 7/08
[52] U.S. Cl. ...................................... 410/115; 410/101
[58] Field of Search ................ 410/101, 102, 104–116; 248/499, 503

[56] References Cited

U.S. PATENT DOCUMENTS

| | | | |
|---|---|---|---|
| 2,786,428 | 3/1957 | Arnold | 410/102 |
| 3,357,670 | 12/1967 | Larson | 410/106 |
| 3,685,778 | 8/1972 | Berns | 410/116 |
| 3,713,616 | 1/1973 | Bowers | 410/105 |
| 4,369,010 | 1/1983 | Ichinose et al. | 410/101 |
| 4,592,686 | 6/1986 | Andrews | 410/101 |
| 4,630,990 | 12/1986 | Whiting | 410/96 X |
| 4,850,769 | 7/1989 | Matthews | 410/110 X |
| 4,850,770 | 7/1989 | Millar, Jr. | 410/110 |
| 4,992,015 | 2/1992 | Florence | 410/104 |

FOREIGN PATENT DOCUMENTS 2574724  6/1986  France ................ 410/109

*Primary Examiner*—Michael S. Huppert
*Assistant Examiner*—Stephen Gordon
*Attorney, Agent, or Firm*—Richard C. Litman

[57] ABSTRACT

A cargo tiedown permanently installable to the bed or floor of the cargo area of a pickup truck, trailer, or other vehicle, provides security for relatively thin, flat or narrow articles (e.g., sheet material, pipe, elongate extrusions, etc.) carried on the bed or floor. The tiedowns are preferably installed in pairs, on opposite sides of the floor or bed. Each tiedown may include one or more tiedown rings or U-bolts, providing for the securing of a rope or other retainer laterally across the floor or bed. The device includes counterbores in the bottom, to provide clearance for the attachment fittings used to secure the U-bolts and/or rings in the device, and allowing for flush mounting of the device to the underlying surface. The device is formed to eliminate sharp edges, in order to better protect any articles with which it might come in contact, and includes a recess at each U-bolt or ring for clearance of the rope or retainer. The main body of the device may be formed of a variety of materials, such as aluminum or steel, either standard or stainless, or even plastic.

15 Claims, 2 Drawing Sheets

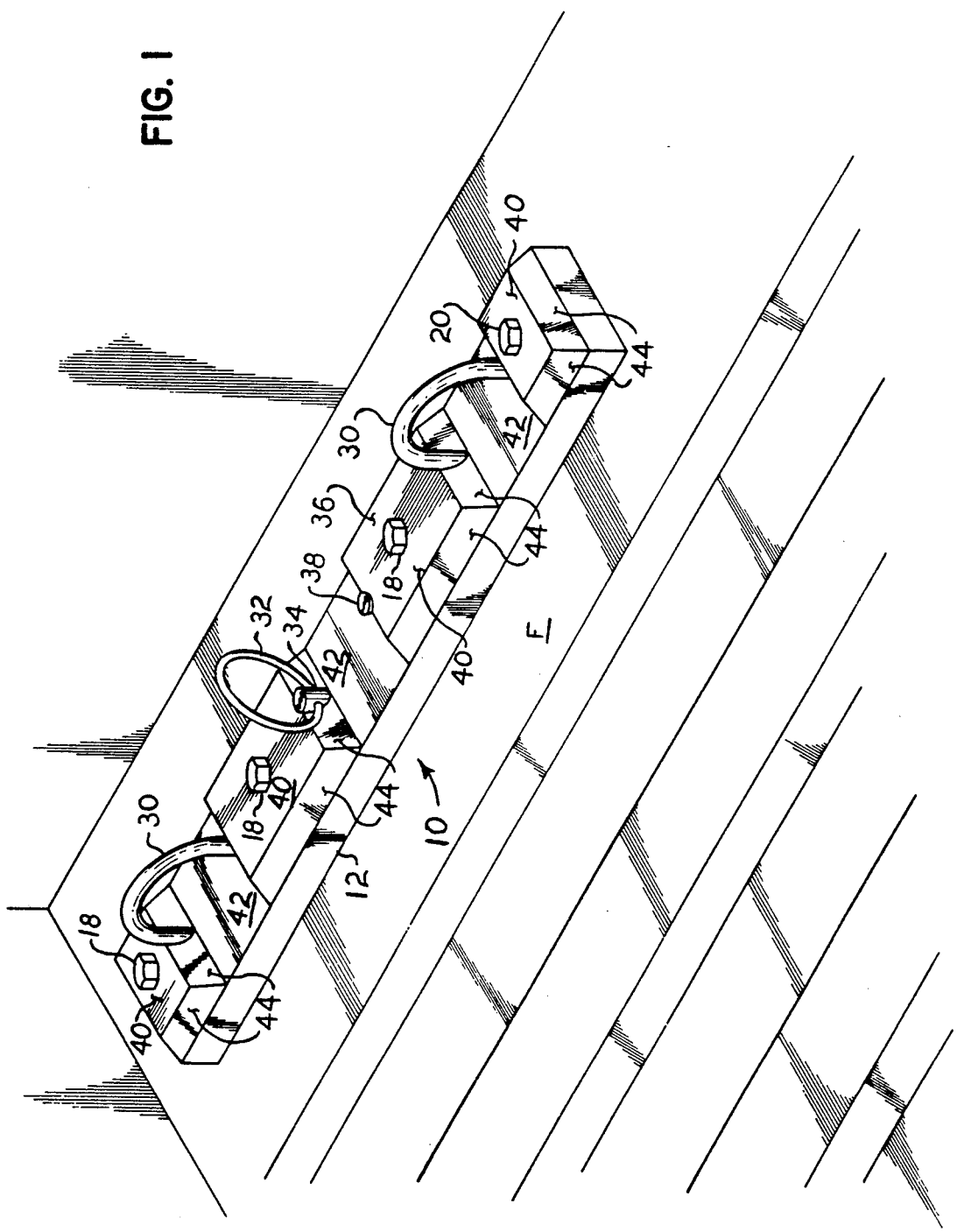

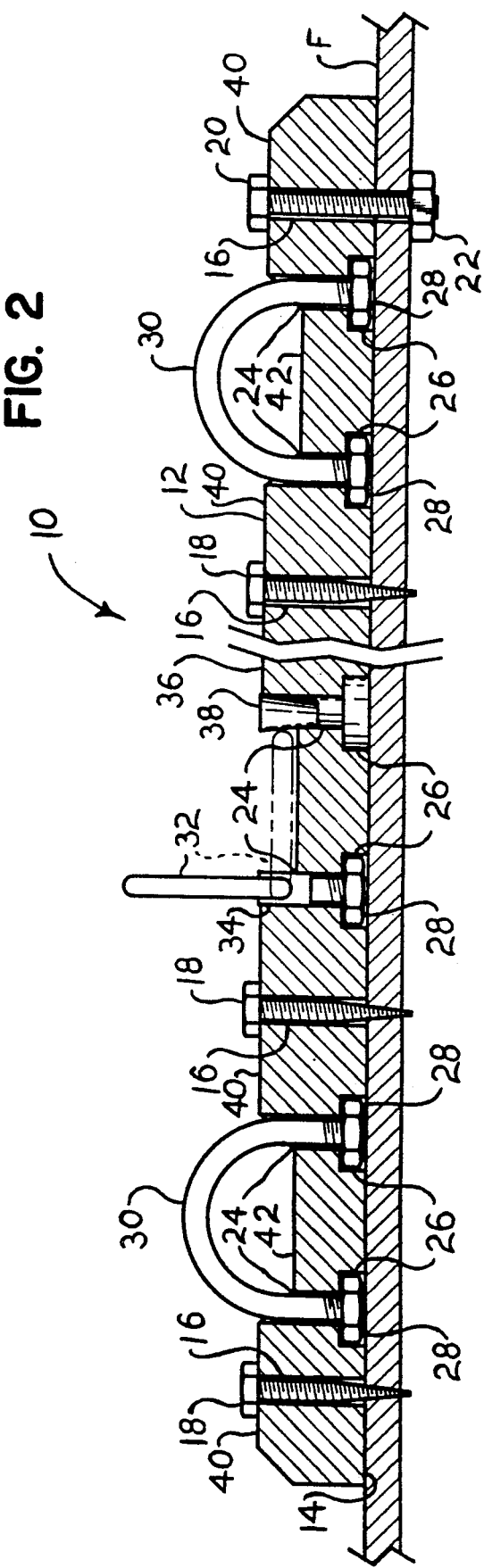

CARGO TIEDOWN

FIELD OF THE INVENTION

The present invention relates generally to tiedowns and brackets for securing articles to another structure, and more specifically to a cargo tiedown installable in the bed or other area of a pickup truck, trailer, or other vehicle and providing secure anchorage for the securing of cargo within the vehicle.

BACKGROUND OF THE INVENTION

Various devices and means have been developed over the years for securing cargo or articles within a pickup box, trailer, or other types of vehicles. In fact, many trailers and pickups are equipped with stake pockets along the side walls of the box or other area, into which stakes or other securing devices may be installed.

The problem with these securing means is that they are all disposed well above the cargo bed of the vehicle, and any ropes or other securing devices tightly secured across the bed, remain well above the surface of the bed. Relatively lightweight sheets of material (e.g., foam insulation) may be readily picked up by the relative wind while in transit, and damaged or possibly even lifted sufficiently to slip between tiedown ropes across the top of the side walls and be blown out of the bed. Even in the case of relatively heavy sheet or other thin material (e.g., pipes and other elongate articles), the play allowed by tiedown means disposed across the top of the side walls, allows a great deal of movement of such cargo on the floor of the cargo area.

The need arises for a tiedown system which is easily and permanently installable to the floor or bed of a cargo area in a pickup, trailer, or other truck or vehicle. The tiedowns should provide for ropes or other ties to be secured relatively close to the floor of the cargo area, thus limiting the vertical space for relatively thin articles to move within the cargo area. Moreover, the tiedowns should be relatively light and small, so as not to impinge significantly upon the area or volume otherwise available for cargo.

DESCRIPTION OF THE PRIOR ART

U.S. Pat. No. 4,369,010 issued to Hisao Ichinose et al. on Jan. 18, 1983 discloses a Reinforced Vehicle Frame And Tie Down Structure for use in the transport of vehicles. The apparatus comprises a conventional U-bolt welded to the vehicle structure, to which a tiedown may be installed to secure the vehicle while in transit during shipping. A bolt installed through the flange formed by the welded frame member to which the U-bolt is secured, provides additional strength in the area of the U-bolt to preclude the separation of the weld in that area due to forces on the U-bolt during transit. The U-bolt is welded directly to the vehicle, unlike the present invention, and is disposed parallel to the sheet member to which it is welded. No means is seen for the adaptation of the apparatus to serve the function of the present invention.

U.S. Pat. No. 4,592,686 issued to Gary E. Andrews on Jun. 3, 1986 discloses a Fastening Device including a U bolt essentially installed to a trunnion fitting to allow for the swiveling or arcuate positioning of the U-bolt relative to two axes. While the device might be installable in the cargo bed of a vehicle, no means is seen to provide for the installation of plural units in a single apparatus, as provided by the present invention.

U.S. Pat. No. 4,630,990 issued to Montague Whiting on Dec. 23, 1986 discloses a Device And Method For Loading And Transporting Elongate Objects On The Tops Of Vehicles. The apparatus comprises a forward crossmember securable to the top of a vehicle, and a rear crossmember supported by an upright securable to the rear bumper and tailgate of a pickup truck. Accordingly, the apparatus does nothing to secure cargo within the bed of a pickup truck or other vehicle.

U.S. Pat. No. 4,850,770 issued to Henry E. Millar, Jr. on Jul. 25, 1989 discloses a Side Rail Tie-Down Anchor comprising a clamp securable to the upper edge or side rail of a pickup truck box side wall or the like. A hook providing for the securing of a tiedown rope thereto extends from the clamp. The device is not permanently attached, nor is it attachable to the bed of the truck box, as in the case of the present invention.

Finally, U.S. Pat. No. 4,992,015 issued to Glen A. Florence on Feb. 12, 1992 discloses a Cargo Tie-Down Anchor comprising an essentially T-shaped section track and a cooperating fitting longitudinally slidable thereon. The fitting may be secured in a desired position by a threaded bolt having a retaining ring thereon. The height of the rail, the fitting thereon, and the tiedown ring extending upward therefrom, result in the tiedown being disposed at a significant height above the underlying surface to which the track is secured.

None of the above noted patents, taken either singly or in combination, are seen to disclose the specific arrangement of concepts disclosed by the present invention.

SUMMARY OF THE INVENTION

By the present invention, an improved cargo tiedown is disclosed.

Accordingly, one of the objects of the present invention is to provide an improved cargo tiedown which provides for the securing of cargo immediately adjacent the floor or bed of the cargo area of a pickup truck, trailer, or other vehicle.

Another of the objects of the present invention is to provide an improved cargo tiedown which is permanently installable to the cargo floor or bed.

Yet another of the objects of the present invention is to provide an improved cargo tiedown which may include plural tiedown means thereon.

Still another of the objects of the present invention is to provide an improved cargo tiedown which tiedown means may comprise either pivotable rings or fixed U-bolts, or a combination of both, as desired.

A further object of the present invention is to provide an improved cargo tiedown which provides clearance means beneath any U-bolts installed therein, and/or for the retraction of any tiedown rings installed therein.

An additional object of the present invention is to provide an improved cargo tiedown which eliminates any sharp protrusions or edges extending therefrom, thereby precluding possible injury to a user thereof or materials in contact therewith.

Another object of the present invention is to provide an improved cargo tiedown which includes clearance for the means used to secure the U-bolts and/or rings to the tiedown body, thereby providing for flush mounting of the body to an underlying surface.

Yet another object of the present invention is to provide an improved cargo tiedown which may be formed of a variety of materials, including, but not limited to, aluminum, standard, or stainless steel.

A final object of the present invention is to provide an improved cargo tiedown for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 1 is a perspective view of the present invention showing it in a typical installation, with two different alternative tiedown means.

FIG. 2 is a broken side view in section along the central vertical plane of the present invention, showing further details.

Similar reference characters denote corresponding features consistently throughout the several figures of the attached drawings.

DETAILED DESCRIPTION OF THE PREFERRED EMBODIMENT

Referring now to the drawings, the present invention will be seen to relate to a cargo tiedown 10 for securing articles and material immediately adjacent the floor F or bed of a vehicle cargo area, as in a pickup truck, trailer, or other cargo carriage means. Cargo tiedown 10 includes an elongate base 12 having a generally flat, planar lower surface 14 (FIG. 2), providing for complementary attachment to a planar surface, such as a flat vehicle cargo area floor F. A series of mounting holes 16 (FIG. 2) normal to the lower surface 14 are provided therethrough for attachment of the base 12 of the tiedown 10 to the cargo floor F, by means of sheet metal screws or lag bolts 18, or alternatively, bolts 20 and nuts 22. Washers (not shown) may also be installed in the conventional manner.

A further series of tiedown attachment holes 24, also normal to the lower surface 14, are provided through the base 12, providing for the attachment of one or more types of tiedown means to the base 12. The base 12 mounting holes 16 and tiedown attachment holes 24 will be seen to be coplanar and lie along the central axis of the base 12, as shown in FIG. 2. Preferably, one pair of tiedown attachment holes 24 is positioned between each of the base mounting holes 16, with a base mounting hole 16 at each end of the base 12, in order that the stresses imposed on the tiedowns by securing lines (not shown) will be evenly distributed between the attachment points; such an arrangement is shown in FIGS. 1 and 2. In order to provide for a flat, planar bottom surface 14 for the base portion 12, recesses 26 (as by counterboring) are provided in each of the tiedown attachment holes 24 adjacent the bottom surface 14. These recesses 26 provide sufficient space for the installation of nuts 28 completely within the recesses 26, in order to preclude the protruding of any of the hardware from beneath the lower surface 14 of the base 12.

The tiedown means used in the present invention may comprise U-bolts 30 having opposite ends installed in each of the adjacent tiedown attachment holes 24 comprising a pair, with the central portion of the U-bolt extending above the base portion 12 to form a tiedown loop. Alternatively, the tiedown means may comprise arcuately pivotable tiedown rings 32. Tiedown rings 32 will be seen to include a threaded eye bolt fitting 34, providing for attachment to the base portion 12 by means of a nut 28 installed in the appropriate recess 26. The eye of the fitting 34 provides for the arcuately pivotable installation of the ring 32, thus allowing the ring 32 to be stowed in a flat position adjacent the top surface 36 of the base 12 when not in use, as shown in FIG. 2. As the tiedown rings 32 and their respective eye bolts 34 each require only a single tiedown attachment hole 24, the tiedown attachment hole opposite such a ring 32 installation may be closed with a cap 38 or plug, to prevent the accumulation of moisture or debris in the hole. While a combination of both U-bolts 30 and a tiedown ring 32 is shown in the tiedown 10 of FIGS. 1 and 2, it will be seen that the series of tiedown means with which any single tiedown 10 is equipped may comprise solely U-bolts 30, or tiedown rings 32, or any combination of the two. Moreover, it will be apparent that tiedowns 10 need not be limited to the three tiedown means shown in FIG. 1, but may be constructed to include either more or fewer tiedown means, as desired.

In order to provide greater strength for the base portion 12 of cargo tiedown 10 and assure a more solid mounting structure, the areas of each of the mounting screws or bolts 18 or 20, are formed with a greater thickness than the remainder of the base 12. These bosses 40 or areas of greater thickness provide additional bearing strength for the attachment screws or bolts 18 or 20, and preclude deformation of the base 12, particularly in the case of lighter materials being used to form the base 12. However, the areas 42 between each of the adjacent tiedown attachment holes 24 will be seen to be relatively low, in order to provide clearance for cargo securing lines or straps beneath the U-bolts 30, and/or to provide space for the retraction of tiedown rings 32, as shown in FIG. 2.

The base 12 of the cargo tiedown 10 of the present invention may be formed of a variety of materials, such as aluminum, standard steel, or even corrosion resistant ("stainless") steel if desired. Alternatively, a hard plastic (e.g., Nylon) might be used, depending upon the required durability and strength. While it is not required that the base 12 be formed of metal or other relatively hard material, such will preferably be the standard material used. Accordingly, any sharp edges could lead to damage to articles or injury to the user who might come in contact with such edges. In order to reduce the possibility of damage or injury, the peripheries of each of the bosses 40 are reduced, e.g., by means of bevels 44. These bevels 44 serve to smooth the edges of the bosses 40 somewhat, and allow articles which might be pushed against the tiedown(s) 10 to avoid contact with sharp edges.

Tiedown(s) 10 are preferably installed in pairs on the cargo floor F of a vehicle, such as the bed of a pickup truck box, trailer, etc., with each member of a pair being installed on a side of the floor F opposite the other pair member. One or more pairs may be installed as desired, by providing mounting holes in the floor F in the locations desired, and using lag bolts 18 and/or bolts 20 to secure the base(s) 12 to the floor F. Flat, thin articles, e.g., pipe, angle iron, sheet material, etc., may then be secured immediately adjacent the floor F by means of rope(s), line(s) or strap(s) being secured laterally across the cargo between corresponding pairs of tiedown means (U-bolts 30 or tiedown rings 32) on opposite cargo tiedowns 10. The resulting arrangement of the tiedown rope(s) line(s) and/or strap(s) made taut immediately above the floor F of the cargo area, prevents the movement of narrow or flat, planar articles in the cargo area due to vehicle movement, acceleration, inertia, relative wind, etc., and serves to secure such articles properly for transport.

It is to be understood that the present invention is not limited to the sole embodiment described above, but encompasses any and all embodiments within the scope of the following claims.

I claim:

1. A cargo tiedown apparatus providing for permanent attachment to a floor in a cargo area of a vehicle, said cargo tiedown apparatus comprising:
   an elongate base portion having a flat, planar lower surface providing for complementary installation of said tiedown apparatus to the vehicle cargo area floor, and including a plurality of tiedown attachment holes normal to said lower surface and extending completely through said base portion,
   at least one tiedown means extending upward from at least one of said tiedown attachment holes;
   said base portion further including a plurality of mounting holes therein and extending completely therethrough, with one mounting hole of said plurality of mounting holes disposed to either side of said at least one tiedown means and each of said mounting holes normal to said lower surface of said base portion;
   each of said tiedown attachment holes includes a recess therein and adjacent said lower surface;
   each said recess comprises a counterbore;
   said at least one tie-down means being installed through a plurality of said attachment holes by means of a plurality of threaded nuts;
   each of said plurality of threaded nuts being disposed completely within a respective one of said recesses thereby precluding protrusion of said threaded nuts from said lower surface of said base portion; and
   said mounting holes and said tiedown attachment holes being coplanar; whereby,
   said cargo tiedown apparatus is permanently installed to the vehicle cargo area floor and cargo is secured immediately adjacent the cargo area floor by means of said tiedown means.

2. The cargo tiedown apparatus of claim 1 including:
   plural tiedown means installed therein, with each of said tiedown means having one said mounting hole disposed to each side thereof.

3. The cargo tiedown apparatus of claim 1 wherein:
   said tiedown means comprises at least one fixed U-bolt extending upward from said base portion and installed through two of said tiedown attachment holes by means of two of said threaded nuts on said at least one fixed U-bolt, with said U-bolt providing an upwardly extending tiedown loop.

4. The cargo tiedown apparatus of claim 1 wherein:
   said tiedown means comprises at least one tiedown ring secured to said base portion by an eye bolt secured through a first one of said tiedown attachment holes in said base portion by means of one of said threaded nuts on said eye bolt, and a second one of said tiedown attachment holes of said base portion being left open, with said ring passing through the eye of said eye bolt and arcuately pivotable therein.

5. The cargo tiedown apparatus of claim 4 including:
   plug means providing for a closure of said second one of said tiedown attachment holes.

6. The cargo tiedown apparatus of claim 1 wherein:
   said tiedown means comprises at least one fixed U-bolt extending upward from said base portion and at least one tiedown ring secured to said base portion.

7. The cargo tiedown apparatus of claim 1 including:
   three tiedown means and four mounting holes installed in said base portion, with each of said three tiedown means alternatingly disposed between two of said four mounting holes.

8. The cargo tiedown apparatus of claim 1 wherein:
   said base portion includes a multilevel upper surface.

9. The cargo tiedown apparatus of claim 8 wherein:
   said multilevel upper surface includes a low area between each of said tiedown attachment holes of said base portion, with said low area providing clearance beneath said tiedown means.

10. The cargo tiedown apparatus of claim 8 wherein:
    said multilevel upper surface includes a plurality of raised areas having peripheries, with each one of said tiedown attachment holes formed through a corresponding one of said raised areas.

11. The cargo tiedown apparatus of claim 10 wherein:
    said peripheries of said raised areas are reduced, thereby eliminating sharp edges along said raised area peripheries and reducing damage to articles coming in contact with said raised area peripheries.

12. The cargo tiedown apparatus of claim 11 wherein:
    said reduction of said raised area peripheries comprises bevels.

13. The cargo tiedown apparatus of claim 1 wherein:
    said base portion is formed of aluminum.

14. The cargo tiedown apparatus of claim 1 wherein:
    said base portion is formed of steel.

15. The cargo tiedown apparatus of claim 1 wherein:
    said base portion is formed of corrosion resistant steel.

* * * * *